(12) United States Patent
Dekker et al.

(10) Patent No.: US 12,400,396 B2
(45) Date of Patent: Aug. 26, 2025

(54) GENERATION OF A 3D POINT CLOUD OF A SCENE

(71) Applicant: Telefonaktiebolaget LM Ericsson (publ), Stockholm (SE)

(72) Inventors: Quinten Dekker, The Hague (NL); Volodya Grancharov, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 294 days.

(21) Appl. No.: 18/023,008

(22) PCT Filed: Sep. 22, 2020

(86) PCT No.: PCT/EP2020/076385
§ 371 (c)(1),
(2) Date: Feb. 24, 2023

(87) PCT Pub. No.: WO2022/063386
PCT Pub. Date: Mar. 31, 2022

(65) Prior Publication Data
US 2023/0326126 A1  Oct. 12, 2023

(51) Int. Cl.
*G06T 17/00* (2006.01)
*G06T 7/174* (2017.01)
*G06T 7/593* (2017.01)

(52) U.S. Cl.
CPC .............. *G06T 17/00* (2013.01); *G06T 7/174* (2017.01); *G06T 7/596* (2017.01);
(Continued)

(58) Field of Classification Search
CPC ......... G06T 17/00; G06T 7/174; G06T 7/596; G06T 2207/10028
See application file for complete search history.

(56) References Cited

U.S. PATENT DOCUMENTS

| 2006/0072821 A1* | 4/2006 | Wang ........................ G06T 7/00 382/173 |
| 2015/0063708 A1* | 3/2015 | Sripadarao ........ G06F 18/24323 382/199 |
| 2015/0300806 A1* | 10/2015 | Goldberg ........... G01B 9/02004 356/479 |
| 2016/0070982 A1* | 3/2016 | Jachalsky ............. G06F 18/285 382/225 |

(Continued)

OTHER PUBLICATIONS

International Search Report and Written Opinion of the International Searching Authority, PCT/EP2020/076385, mailed Jun. 1, 2021, 13 pages.
(Continued)

*Primary Examiner* — Grace Q Li
(74) *Attorney, Agent, or Firm* — Sage Patent Group

(57) ABSTRACT

A method for generating a 3D point cloud of a scene is performed by an image processing device. The method obtains digital images depicting the scene. Each digital image is composed of pixels. The method includes segmenting each of the digital images into digital image segments. The method includes determining a depth vector and a normal vector per each of the digital image segments by applying MVS processing to a subset of the pixels per each digital image segment. The method includes forming a map of depth vectors and normal vectors per each pixel in the digital images by, based on the determined depth and normal vectors per each of the digital image segments, estimating a 3D plane per digital image segment. The method includes generating the 3D point cloud of the scene as a combination of all the maps of depth vectors and normal vectors per each pixel in the digital images.

15 Claims, 7 Drawing Sheets

(52) U.S. Cl.
CPC .............................. *G06T 2200/08* (2013.01); *G06T 2207/10012* (2013.01); *G06T 2207/10028* (2013.01)

(56) References Cited

U.S. PATENT DOCUMENTS

| | | | |
|---|---|---|---|
| 2017/0053397 A1* | 2/2017 | Chukka | G06F 18/23 |
| 2017/0061632 A1* | 3/2017 | Lindner | G06V 20/46 |
| 2017/0127046 A1* | 5/2017 | Das | H04N 13/239 |
| 2021/0073953 A1* | 3/2021 | Lee | G06N 3/084 |
| 2021/0183080 A1* | 6/2021 | Hoiem | G06T 19/20 |

OTHER PUBLICATIONS

Kuhn, Andreas et al., "Plane Completion and Filtering for Multi-View Stereo Reconstruction," Advances in Intelligent Data Analysis XIX, Oct. 25, 2019, pp. 18-32.

Romanoni, Andrea et al., "TAPA-MVS: Textureless-Aware PAtchMatch Multi-View Stereo," arxiv.org, XP081158239, Mar. 26, 2019, 10 pages.

Chuchvara, Aleksandra et al., "Fast and Accurate Depth Estimation From Sparse Light Fields," IEEE Transactions on Image Processing, vol. 20, Dec. 17, 2019, 15 pages.

Achanta, Radhakrishna et al., " SLIC Superpixels Compared to State-of-the-Art Superpixel Methods," IEEE Transactions on Pattern Analysis and Machine Intelligence, vol. 34, No. 11, Nov. 2012, pp. 2274-2282.

Furukawa, Yasutaka et al., "Multi-View Stereo: A Tutorial," Foundations and Trends in Computer Graphics and Vision, vol. 9, No. 1-2, 2013, 40 pages.

Poms, Alex et al., "Learning Patch Reconstructability for Acceleratiomg Multi-View Stereo," 2018 IEEE/CVF Conference on Computer Vision and Pattern Recognition, 10 pages.

Schonberger, Johannes Lutz, "Robust Methods for Accurate and Efficient 3D Modeling from Unstructured Imagery," Thesis (Diss. Eth No. 25370), 2018, 291 pages.

* cited by examiner

GENERATION OF A 3D POINT CLOUD OF A SCENE

CROSS REFERENCE TO RELATED APPLICATIONS

This application is a 35 U.S.C. § 371 national stage application of PCT International Application No. PCT/EP2020/076385 filed on Sep. 22, 2020, the disclosure and content of which is incorporated by reference herein in its entirety.

TECHNICAL FIELD

Embodiments presented herein relate to a method, an image processing device, a computer program, and a computer program product for generating a three-dimensional (3D) point cloud of a scene.

BACKGROUND

In general terms, 3D Point Cloud Generation (3D PCG) is the process of transforming visual two-dimensional (2D) information (i.e. a set of digital images) into 3D information. 3D PCG is considered as a key enabling technology in the domain of Extended Reality (XR) as 3D PCG can be used to create spatial understanding and let users interact with their environment based only on visual information.

The process generating a 3D point cloud typically comprises a sparse modelling phase and a dense modelling phase, where the densification step creates the final 3D point cloud through a process called Multi-View Stereo (MVS) processing.

In general terms, the goal of MVS processing is to obtain a set of consistent depth images (represented by depth and normal vectors) for each digital image in the input set of digital images. Most state-of-the-art MVS algorithms combine the estimation of depth images with normal images. These normal images contain an estimation of the orientation of the captured surface at the pixel level and increase the performance.

After estimating a depth and normal image for each input image the 3D point cloud can be obtained by means of fusing the estimates of each image in a consistent 3D point cloud.

With the rapid growth of high-quality visual sensors, the resolution of image capturing devices, such as digital cameras, has increased dramatically over the recent years. As MVS is applied on the pixel level it scales poorly with increasing image resolutions and is computationally demanding. Based on this trend a need is created to improve the scalability of MVS and similar algorithms without sacrificing quality. For example, in many practical settings, such as XR, the goal is to create a near real-time 3D point cloud for a direct spatial understanding.

One approach to decrease the computational burden is to downscale the input digital images (using for example a bilinear filter) and run MVS processing on the thus reduced size digital images. This accelerates the MVS processing, but details are lost, and the final 3D point cloud might fail to capture finer details, such as sharp boundary edges, in the original input digital images. This limits the possibility to improve the scalability of MVS processing, when fine details of the visual scene need to be retained.

Another approach to accelerate the MVS processing involves training of a neural network is on data from a specific domain. However, this could only reduce the MVS processing for input digital images that are similar to the trained domain, and hence limits the practical use of this approach.

Hence, there is still a need for computationally efficient 3D point cloud generation.

SUMMARY

An object of embodiments herein is to provide computationally efficient 3D point cloud generation without sacrificing the end quality of the resulting 3D point cloud.

According to a first aspect there is presented a method for generating a 3D point cloud of a scene. The method is performed by an image processing device. The method comprises obtaining digital images depicting the scene. Each digital image is composed of pixels. The method comprises segmenting each of the digital images into digital image segments. The method comprises determining a depth vector and a normal vector per each of the digital image segments by applying MVS processing to a subset of the pixels per each digital image segment. The method comprises forming a map of depth vectors and normal vectors per each pixel in the digital images by, based on the determined depth and normal vectors per each of the digital image segments, estimating a 3D plane per digital image segment. The method comprises generating the 3D point cloud of the scene as a combination of all the maps of depth vectors and normal vectors per each pixel in the digital images.

According to a second aspect there is presented an image processing device for generating a 3D point cloud of a scene. The image processing device comprises processing circuitry. The processing circuitry is configured to cause the image processing device to obtain digital images depicting the scene. Each digital image is composed of pixels. The processing circuitry is configured to cause the image processing device to segment each of the digital images into digital image segments. The processing circuitry is configured to cause the image processing device to determine a depth vector and a normal vector per each of the digital image segments by applying MVS processing to a subset of the pixels per each digital image segment. The processing circuitry is configured to cause the image processing device to form a map of depth vectors and normal vectors per each pixel in the digital images by, based on the determined depth and normal vectors per each of the digital image segments, estimating a 3D plane per digital image segment. The processing circuitry is configured to cause the image processing device to generate the 3D point cloud of the scene as a combination of all the maps of depth vectors and normal vectors per each pixel in the digital images.

According to a third aspect there is presented an image processing device for generating a 3D point cloud of a scene. The image processing device comprises an obtain module configured to obtain digital images depicting the scene. Each digital image is composed of pixels. The image processing device comprises a segment module configured to segment each of the digital images into digital image segments. The image processing device comprises a determine module configured to determine a depth vector and a normal vector per each of the digital image segments by applying MVS processing to a subset of the pixels per each digital image segment. The image processing device comprises a form module configured to form a map of depth vectors and normal vectors per each pixel in the digital images by, based on the determined depth and normal vectors per each of the digital image segments, estimating a 3D plane per digital image segment. The image processing device comprises a generate module configured to generate the 3D point cloud of the scene as a combination of all the maps of depth vectors and normal vectors per each pixel in the digital images.

According to a fourth aspect there is presented a computer program for generating a 3D point cloud of a scene, the computer program comprising computer program code which, when run on an image processing device, causes the image processing device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects provide computationally efficient 3D point cloud generation of the scene, without sacrificing performance.

Advantageously these aspects achieve a significant reduction in computation time during the MVS processing comparted to state-of-the-art without sacrificing 3D point cloud quality.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, there is still a need for computationally efficient 3D point cloud generation The embodiments disclosed herein therefore relate to mechanisms for generating a 3D point cloud of a scene. In order to obtain such mechanisms there is provided an image processing device, a method performed by the image processing device, a computer program product comprising code, for example in the form of a computer program, that when run on an image processing device, causes the image processing device to perform the method.

Figure 1:
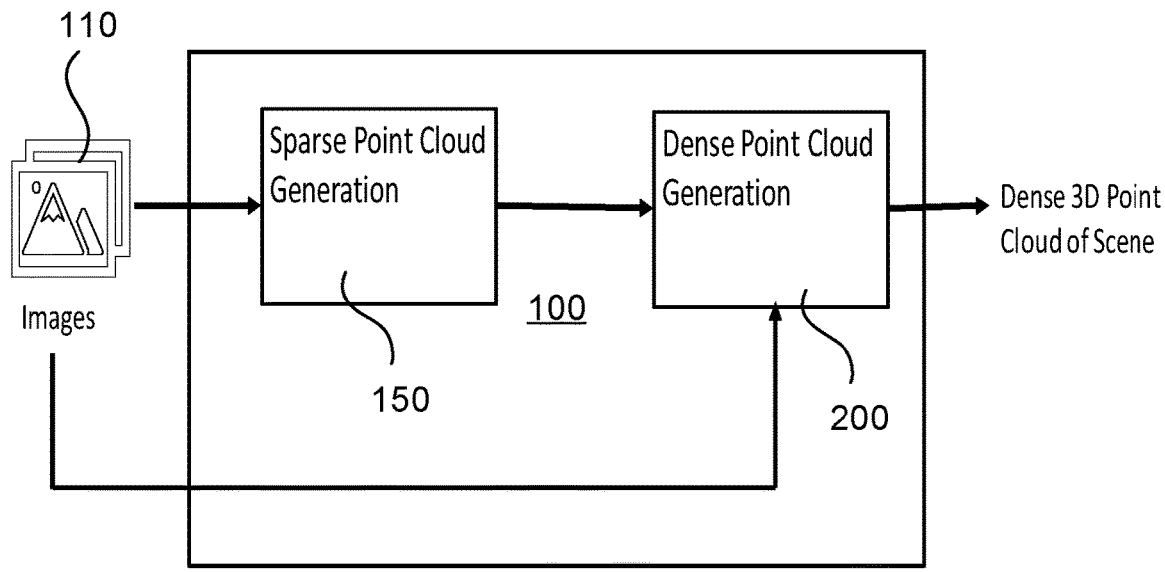
FIG. 1 is a schematic diagram illustrating an image processing system according to embodiments.

FIG. 1 is a schematic diagram illustrating an image processing system 100 according to an embodiment. The image processing system 100 is configured to generate a 3D point cloud of a scene as depicted by digital images 110. The image processing system 100 comprises a first image processing device in the form of a sparse point cloud generation module 150 and a second image processing device 200 in the form of a dense point cloud generation module.

The sparse point cloud generation module is configured to, from a received set of 2D digital images 110 of the scene, relate the digital images 110 to each other with respect to how the digital images 110 are oriented with respect to each other. The location (in term of position and direction) at which each of the digital images 110 has been captured can thereby be determined. The sparse point cloud generation module is configured to extract key-points from those digital images 110 and to establish correspondence between the extracted key-points. Depth values of the matched key-points are estimated based on triangulation, thus creating a sparse point cloud.

The dense point cloud generation module is configured to estimate depth and normal vectors for all image pixels (i.e., beyond the key-points) in the digital images 110. When this is achieved, these pixels also contribute to a dense 3D model, or point cloud, of the scene. Further aspects of the dense point cloud generation module will be disclosed below. For ease of notation the dense point cloud generation module will hereinafter be referred to as an image processing device 200.

Figure 2:
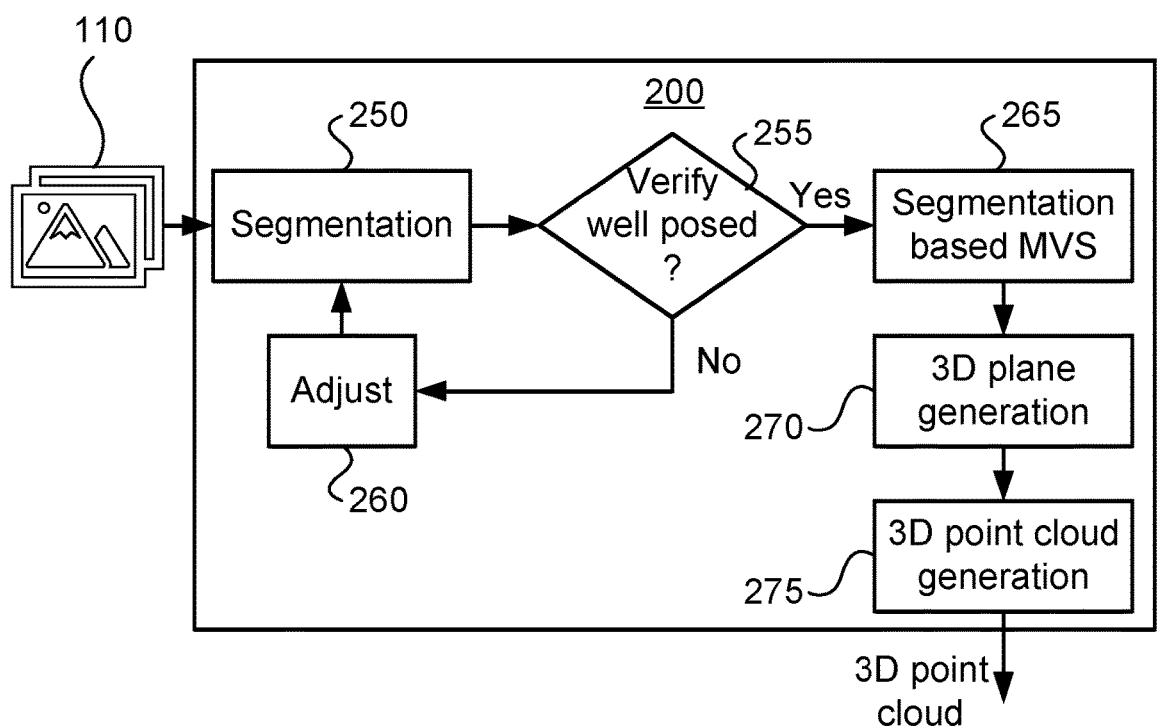
FIG. 2 is a schematic diagram illustrating an image processing device according to embodiments.

FIG. 2 is a schematic diagram illustrating the image processing device 200 implementing the functionality of the dense point cloud generation module according to an embodiment. FIG. 2 will be explained with parallel reference to FIG. 3.

Figure 3:
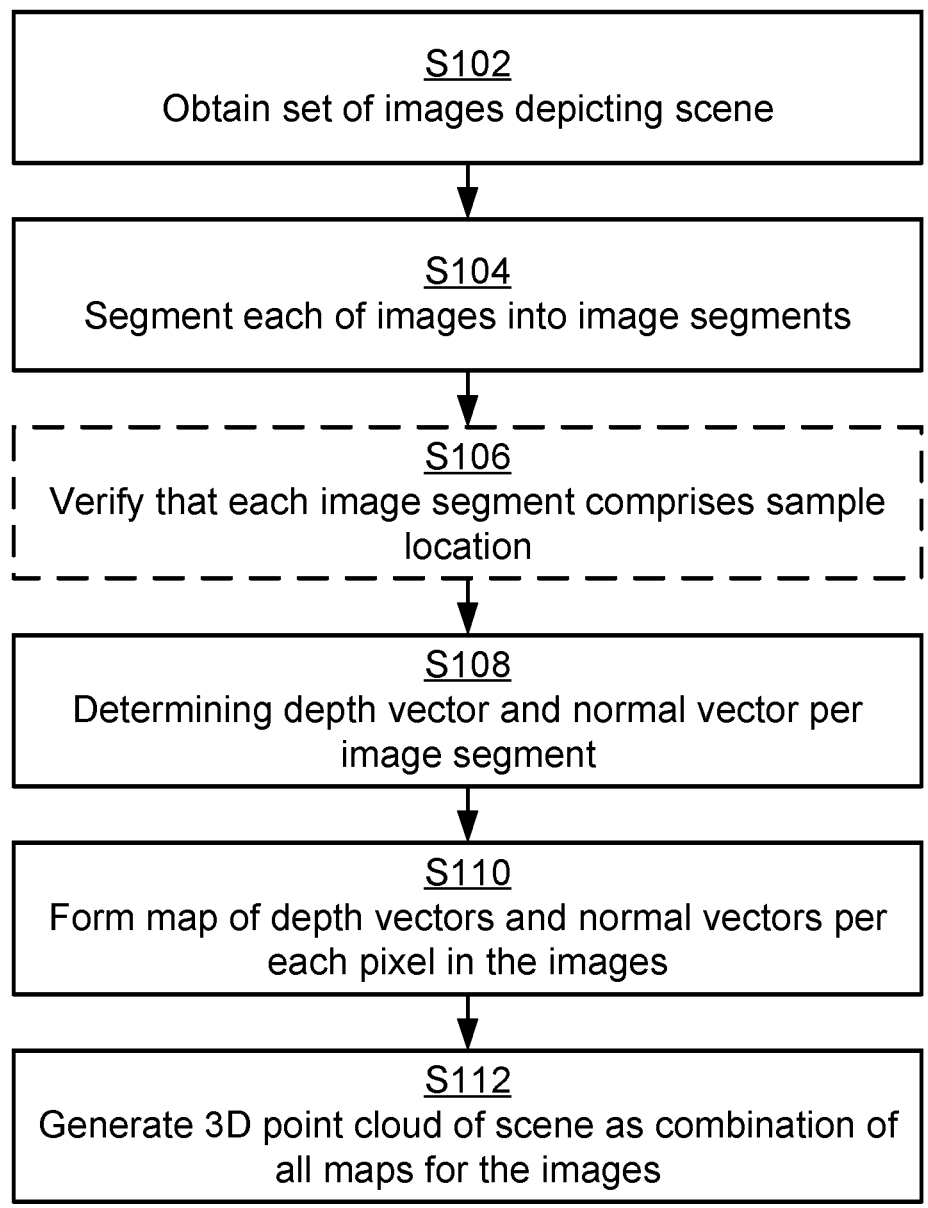
FIG. 3 is a flowchart of methods according to embodiments.

FIG. 3 is a flowchart illustrating embodiments of methods for generating a 3D point cloud of a scene. The methods are performed by the image processing device 200. The methods are advantageously provided as computer programs 1020.

The 3D point cloud is generated from digital images 110 depicting the scene. Hence, the image processing device 200 is configured to perform step S102:

S102: The image processing device 200 obtains digital images 110 depicting the scene. Each digital image 110 is composed of pixels 112.

To enable the MVS processing to only be applied to a subset of all the pixels 112 in each image, each digital image 110 is first segmented into digital image segments 116. Hence, the image processing device 200 is configured to perform step S104:

S104: The image processing device 200 segments each of the digital images 110 into digital image segments 116. Step S104 might be implemented by the segmentation module 250 in FIG. 2.

MVS processing is then applied on a digital image segment level instead of on a per pixel level. Hence, the image processing device 200 is configured to perform step S108:

S108: The image processing device 200 determines a depth vector and a normal vector per each of the digital image segments 116 by applying MVS processing to a subset of the pixels 112 per each digital image segment 116. Step S108 might be implemented by the segmentation based MVS module 265 in FIG. 2.

Depth vectors and normal vectors are then determined per each pixel 112 in each digital image segment 116. Hence, the image processing device 200 is configured to perform step S110:

S110: The image processing device 200 forms a map of depth vectors and normal vectors per each pixel 112 in the digital images 110 by, based on the determined depth and normal vectors per each of the digital image segments 116, estimating a 3D plane per digital image segment 116. Step S110 might be implemented by the 3D plane generation module 270 in FIG. 2.

The 3D point cloud of the scene is then generated based on the depth vectors and normal vectors per each pixel 112. Hence, the image processing device 200 is configured to perform step S112:

S112: The image processing device 200 generates the 3D point cloud of the scene as a combination of all the maps of depth vectors and normal vectors per each pixel 112 in the digital images 110. Step S112 might be implemented by the 3D point cloud generation module 275 in FIG. 2.

Since MVS processing is applied on the digital image segment level instead of the pixel level the number of computations that are required can be drastically reduced. In turn, this enables acceleration to be achieved without sacrificing accuracy of the resulting 3D point cloud.

Embodiments relating to further details of generating a 3D point cloud of a scene as performed by the image processing device 200 will now be disclosed.

Further aspects relating to how the image processing device 200 might segment each of the digital images 110 into digital image segments 116 will now be disclosed.

There could be different ways to perform the segmentation in step S104. In some aspects the segmentation is performed application of a segmentation mask. That is, in some embodiments, segmenting the digital images 110 into the digital image segments 116 comprises applying a segmentation mask to each of the digital images 110. The segmentation mask could be either image independent (i.e., independent of the scene) or image dependent (i.e., dependent on the scene). In some non-limiting examples the segmentation mask is determined using the Simple Linear Iterative Clustering (SLIC) algorithm as disclosed in Radhakrishna Achanta, Appu Shaji, Kevin Smith, Aurelien Lucchi, Pascal Fua, and Sabine Süsstrunk, "*SLIC Superpixels Compared to State-of-the-art Superpixel Methods*", IEEE Transactions on Pattern Analysis and Machine Intelligence, vol. 34, num. 11, p. 2274-2282, May 2012. In some embodiments each digital image segment 116 is thus equal to one super-pixel. The segmentation mask could then define boundaries between the super-pixels.

Denote by K the number of digital image segments 116. This number is related to the size $px_{min}$ of the smallest object that need to be retained in the 3D point cloud of the scene. The smallest objects thus represent the finest details in the scene that need to be retained in the abstraction. Which objects that need to be retained generally depends on the usage, or application, of the 3D point cloud of the scene. For example, assume that the scene depicts a cell tower, and that the cell tower is composed of individual components. If the usage, or application, of the 3D point cloud of the scene pertains to identifying one of the components, each component might thus be represented by an object and it is thus sufficient that the segmentation is performed such that the objects representing all these individual components are retained. On the other hand, if the usage, or application, of the 3D point cloud of the scene pertains to identifying particular details (such as a lock, a nut, a bolt, etc.) of one or more of the components, then it is necessary that the segmentation is performed such that the objects representing all these particular details are retained. Thus, the number of digital image segments 116 might depend not only on how detailed the scene itself is but also on for what purpose, in terms of level of detail, the 3D point cloud of the scene is to be used. In some aspects, the number of digital image segments 116 is thus based on object size. In this respect, the scene is assumed comprises at least one object 118. Each of the at least one object 118 has a size in the digital images 110. In some embodiments, how many digital image segments 116 each digital image 110 is segmented into depends on the size of the at least one object 118. Further aspects of this will be disclosed below.

The number of digital image segments 116 might be bounded by the size of smallest object 118 on the one hand and by the number of sample locations 114 on the other hand.

In this respect, the size of smallest object 118 in the scene might define the minimum number of digital image segments 116. In particular, in some embodiments, the size of the smallest object 118 defines a lower bound on how many digital image segments 116 each digital image 110 needs to be segmented into. In some examples, the number of digital image segments 116 is based on the number of sample locations 114. In particular, in some embodiments, how many digital image segments 116 each digital image 110 is segmented into depends on at how many sample locations 114 in each digital image 110 the MVS processing is applied.

Further in this respect, the number of sample locations 114 might define the maximum number of digital image segments 116. In particular, in some embodiments, the total amount of sample locations 114 in each digital image 110 defines an upper bound on how many digital image segments 116 each digital image 110 needs to be segmented into.

Figure 4:
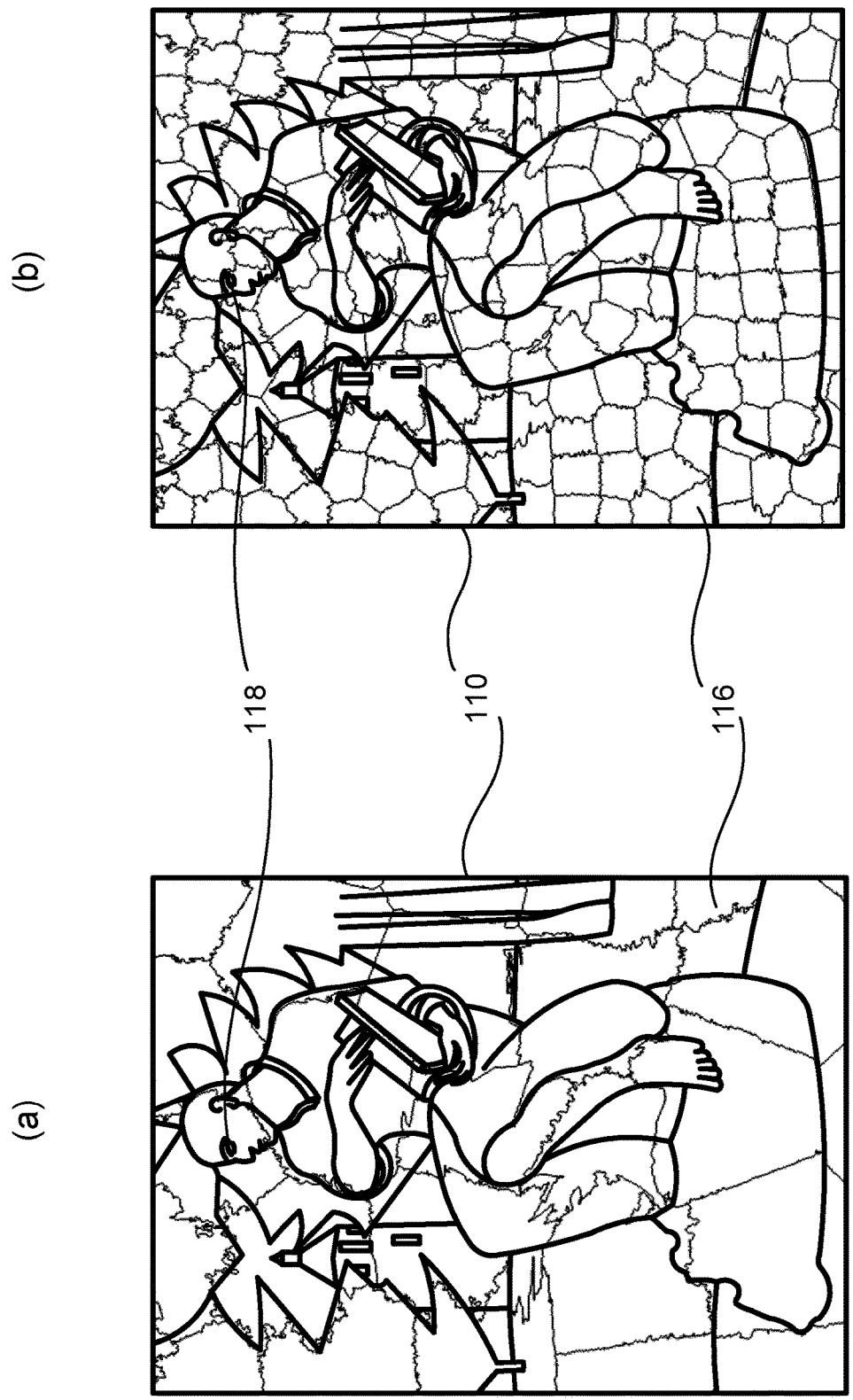
FIG. 4 schematically illustrates segmentation of a digital image according to embodiments.
Figure 4:
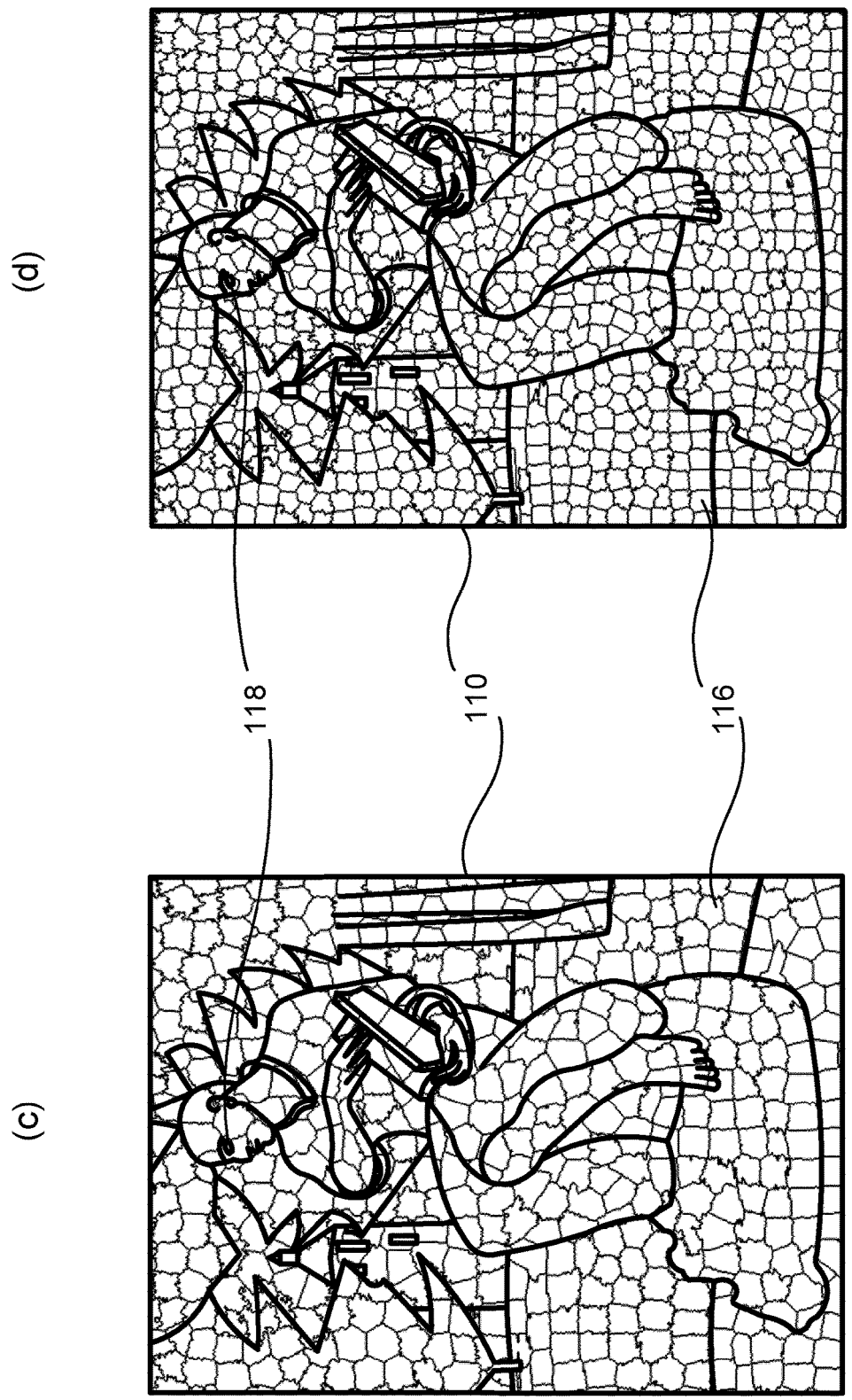

FIG. 4 at (a), (b), (c), and (d) illustrates the resulting segmentation of the same digital image no for K=100, K=1000, K=2500, and K=5000, respectively.

In some aspects, it is verified that the segmentation yields that there is at least one sample location 114 in each digital image segment 116. If this is not the case the segmentation is considered ill-posed. Assuming that the pixels 112 included in the subsets of pixels 112 are defined by sample locations 114 in the digital images 110, in some embodiment the image processing device 200 is configured to perform (optional) step S106:

S106: The image processing device 200 verifies that each digital image segment 116 comprises at least one sample location 114. Step S106 might be implemented by the verify well posed module 255 in FIG. 2.

In embodiments where step S106 is performed, step S106 is performed before step S108.

To check whether each digital image segment 116 comprises at least one sample location 114 or not, each digital image segment 116 could be checked to determine whether there is a sample location 114 within each digital image segment 116.

If the segmentation is considered ill-posed, i.e., that each digital image segment 116 fails to comprise at least one sample location 114, then the size of the digital image segments 116 might be increased, thus resulting in that the segmentation in step S104 is performed once again but with the thus increased size of the digital image segments 116. This feature might be implemented by the adjust module 260 in FIG. 2. That is, in some embodiments, when at least one digital image segment 116 fails to comprise at least one sample location 114, the segmentation of at least the digital image 110 for which the digital image segment 116 fails to comprise at least one sample location 114 is repeated with increased size of the digital image segments 116.

Further aspects relating to how the image processing device 200 might determine the depth vector and normal vector per each of the digital image segments 116 will now be disclosed.

As specified above, MVS processing is applied to a subset of the pixels 112 per each digital image segment 116. MVS processing is thus applied on a sparse set of M pixels, equal to the pixels at the sample locations 114. Depth and normal vectors for every point in sparse set of M pixels are thus determined.

There could be different ways to determine this sparse set of M pixels.

Figure 5:
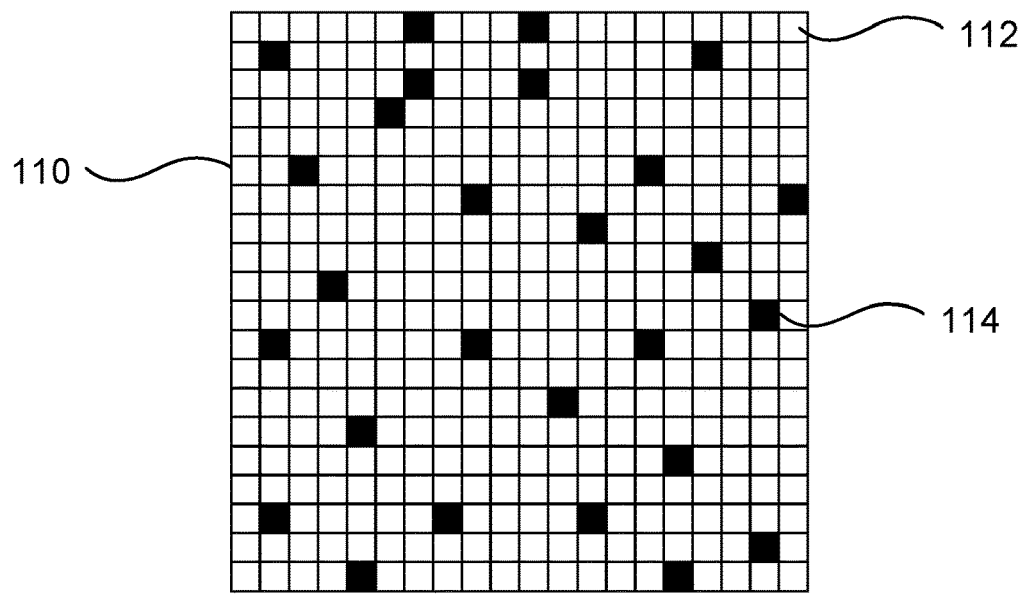
FIG. 5 and FIG. 6 schematically illustrate sample locations in a digital image according to embodiments.

In some aspects the subset of the pixels correspond to the centroids of the digital image segments 116. That is, in some embodiments, each digital image segment 116 has a centroid, and the subset of the pixels are the centroids of the digital image segments 116. This is illustrated in FIG. 5 which shows pixels 112 of a digital image 110 and where the subset of the pixels, as located at the sample locations 114, thus coincides with the K centroids of the digital image segments 116 obtained in step S104.

Figure 6:
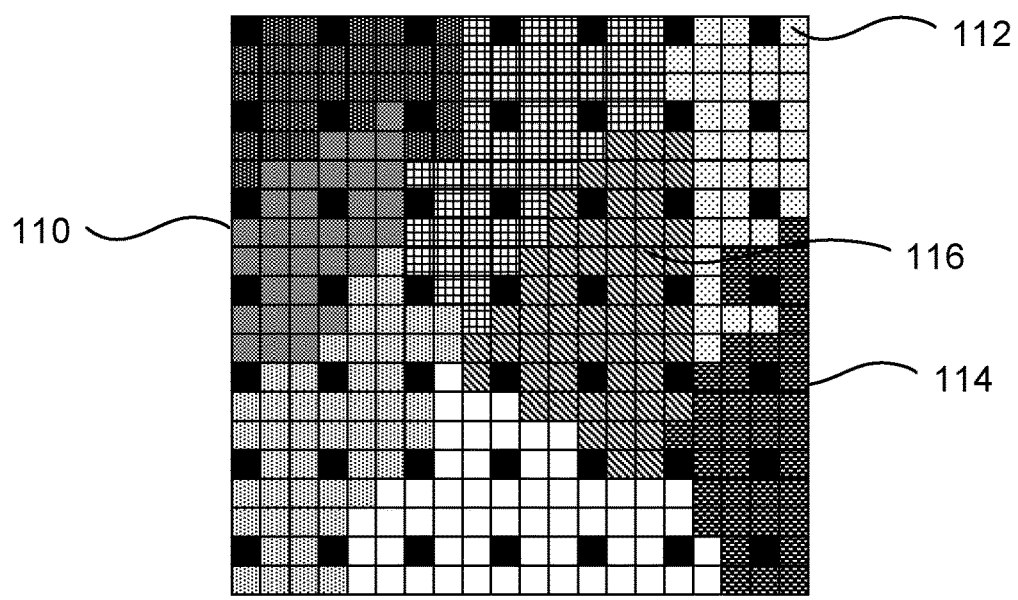

In other aspects the pixels of the subset of the pixels are uniformly spread in each digital image 110. That is, in some embodiments, the subset of the pixels are uniformly sampled pixels per digital image 110. This is illustrated in FIG. 6 which shows pixels 112 of a digital image no and where the subset of the pixels, as located at the sample locations 114, thus are formed as a uniform grid taking every m:th point in the digital image 110. This uniform grid does not necessarily coincide with the centroids of the digital image segment 116, but each pixel in the subset of the pixels belongs to a digital image segment 116. The implementation in FIG. 5 could give slightly better reconstruction in case of large digital image segments 116, but the implementation in FIG. 6 could be more computationally and memory efficient.

As noted above, regardless how the subset of pixels are selected, each digital image segment 116 should comprise at least one sample location 114.

Further aspects of how the image processing device 200 might form the map of depth vectors and normal vectors per each pixel 112 in the digital images 110 will now be disclosed.

In some aspects, the map of depth vectors and normal vectors per each pixel 112 in the digital images 110 is formed by fusion of the digital image segment mask and the depth vectors and normal vectors per each of the digital image segments 116 determined in step S108. In some examples the fusion involves estimating a 3D plane for each digital image segment 116. In particular, in some embodiments, forming the map of depth vectors and normal vectors per each pixel 112 in the digital images 110 as in step S110 further comprises to, per digital image 110, interpolate the 3D planes with respect to each other.

The digital image segment mask and the depth and normal vectors from the subset of M pixels are thus used to recover the missing information, yielding a map of depth vectors and normal vectors per each pixel 112 in the digital images 110, and thus resulting in original image resolution of N pixels. In some aspects the interpolation thus involves estimating 3D planes and projecting each 3D plane to the map of depth vectors and normal vectors per each pixel 112 in the digital images no. That is, in some embodiments, to interpolate the 3D plane comprises to, per digital image segment 116, project the 3D planes to the map of depth vectors and normal vectors.

Further aspects relating to how the number of digital image segments 116 could be determined will now be disclosed.

On the one hand it could be advantageous to have as few digital image segments 116 as possible since this would minimize the number of sample locations 114. However, depending on the scene, there is a point where it is not possible to use fewer digital image segments 116. This is dependent on the finest details, or objects 118, that need to be retained in the abstraction where hence a high number of digital image segments 116 are better able to grasp fine details. To determine what then a proper number of digital image segments K is, define the average area S of a digital image segment 116 as:

$$S = \sqrt{\frac{w \cdot h}{K}} \tag{1}$$

where w is the image with, h is the image height. Next, it is required that objects of at least size $px_{min}$ pixels are retained in the abstraction. Substituting this in Equation (1) yields:

$$S = px_{min} = \sqrt{\frac{w \cdot h}{K}} \xrightarrow{yields} K = \frac{w \cdot h}{px_{min}^2} \tag{2}$$

In some non-limiting examples, a safety-margin of 10% is added to Equation (2), thus yielding the number of required digital image segments K as:

$$K = 1.1 \cdot \frac{w \cdot h}{px_{min}^2}.$$

Further aspects relating to how the depth and normal vectors per pixel in each digital image segment 116 could be determined will be disclosed next.

Let each digital image segment 116 be defined as a collection of pixel points on an image domain:

$$(u, v) \in \Omega_i.$$

The goal is equal to identifying a 3D plane defined as:

$$\pi_i := ax + by + cz + d. \tag{3}$$

Figure 7:
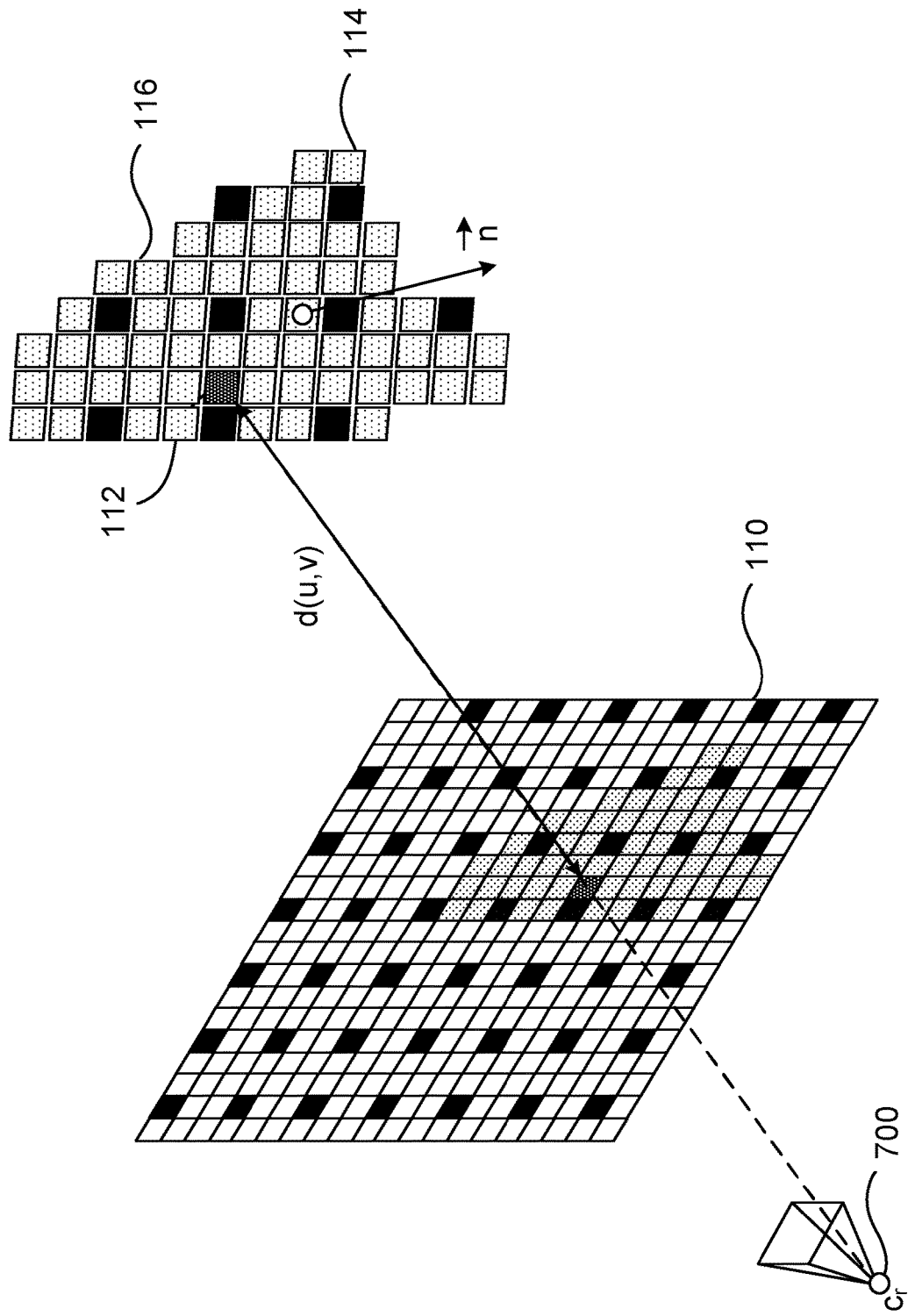
FIG. 7 schematically illustrates interpolation according to embodiments.

Having estimated such 3D plane, the depth and normal vectors within $\Omega_i$ are obtained as:

$$\vec{n}(u, v) = (a, b, c)^T, \quad (u, v) \in \Omega_i$$

$$d(u, v) = \frac{d}{(ae + bf + c)} \quad (u, v) \in \Omega_i,$$

where (a, b, c, d) are the plane parameters of Equation (3) and e and f are defined as:

$$e = \frac{u - f_u}{c_u}$$

$$f = \frac{v - f_v}{c_v}.$$

where the parameters are obtained from the intrinsic camera calibration matrix ($f_u$, $f_v$, $c_u$, $c_v$). FIG. 7 illustrates how interpolation for a given pixel 112 can be performed by estimating a plane for each super-pixel (right) using the sparse information (at the sample locations 114) and projecting the plane back into the depth-normal map (left), and where 700 denotes the location at which the digital image 110 comprising the illustrated digital image segment 116.

The plane-estimation problem is then framed as a robust regression problem where the sub-set of pixels which are processed by the MVS are collected. For each measurement this yields:

$$A_i x_i = b_i$$

where $$A_i = \begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix}, x_i = \begin{pmatrix} c_x \\ c_y \\ c_z \\ \theta \\ \varphi \end{pmatrix}, b_i = \begin{pmatrix} z_x \\ z_y \\ z_z \\ \theta_z \\ \varphi_z \end{pmatrix}$$

where the state $x=(c_x, c_x, c_x, \theta, \varphi)$ is defined by the centroid c and the normal vector $\vec{n}$ defined in spherical coordinates as $\vec{n}=(\theta, \varphi)$. Stacking all measurements, an error $\varepsilon_i$ can be defined for one digital image segment 116 as $$\varepsilon_i = A_i x_i - b_i, \quad A_i = \begin{pmatrix} A_o \\ A_1 \\ \cdot \\ \cdot \\ \cdot \\ A_T \end{pmatrix}, b_i = \begin{pmatrix} b_0 \\ b_1 \\ \cdot \\ \cdot \\ \cdot \\ b_T \end{pmatrix}$$

The plane parameters are then obtained by minimizing a Huber's loss function:

$$\min_{x_i} \rho(\varepsilon_i^2)$$

Repeating this process for each digital image segment $0 \leq i \leq J$ yields a map of depth and normal vectors per pixel in each digital image segment 116.

Figure 8:
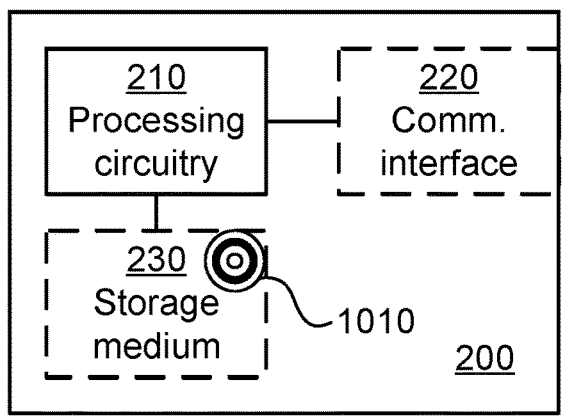
FIG. 8 is a schematic diagram showing functional units of an image processing device according to an embodiment.

FIG. 8 schematically illustrates, in terms of a number of functional units, the components of an image processing device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10, e.g. in the form of a storage medium 230. The processing circuitry 210 may further be provided as at least one application specific integrated circuit (ASIC), or field programmable gate array (FPGA).

Particularly, the processing circuitry 210 is configured to cause the image processing device 200 to perform a set of operations, or steps, as disclosed above. For example, the storage medium 230 may store the set of operations, and the processing circuitry 210 may be configured to retrieve the set of operations from the storage medium 230 to cause the image processing device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The image processing device 200 may further comprise a communications interface 220 at least configured for communications with other entities, functions, nodes, modules, and systems. As such the communications interface 220 may comprise one or more transmitters and receivers, comprising analogue and digital components. The processing circuitry 210 controls the general operation of the image processing device 200 e.g. by sending data and control signals to the communications interface 220 and the storage medium 230, by receiving data and reports from the communications interface 220, and by retrieving data and instructions from the storage medium 230. Other components, as well as the related functionality, of the image processing device 200 are omitted in order not to obscure the concepts presented herein.

Figure 9:
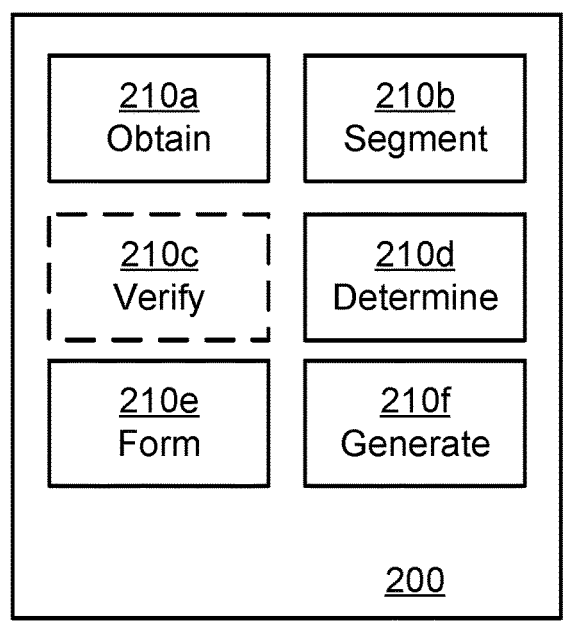
FIG. 9 is a schematic diagram showing functional modules of an image processing device according to an embodiment.

FIG. 9 schematically illustrates, in terms of a number of functional modules, the components of an image processing device 200 according to an embodiment. The image processing device 200 of FIG. 9 comprises a number of functional modules; an obtain module 210a configured to perform step S102, a segment module 210b configured to perform step S104, a determine module 210d configured to perform step S108, a form module 210e configured to perform step S110, and a generate module 210f configured to perform step S112. The image processing device 200 of FIG. 9 may further comprise a number of optional functional modules, such a verify module 210c configured to perform step S106. In general terms, each functional module 210a-210f may in one embodiment be implemented only in hardware and in another embodiment with the help of software, i.e., the latter embodiment having computer program instructions stored on the storage medium 230 which when run on the processing circuitry makes the image processing device 200 perform the corresponding steps mentioned above in conjunction with FIG. 9. It should also be mentioned that even though the modules correspond to parts of a computer program, they do not need to be separate modules therein, but the way in which they are implemented in software is dependent on the programming language used.

Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

The image processing device 200 may be provided as a standalone device or as a part of at least one further device. A first portion of the instructions performed by the image processing device 200 may be executed in a first device, and a second portion of the of the instructions performed by the image processing device 200 may be executed in a second device; the herein disclosed embodiments are not limited to any particular number of devices on which the instructions performed by the image processing device 200 may be executed. Hence, the methods according to the herein disclosed embodiments are suitable to be performed by an image processing device 200 residing in a cloud computational environment. Therefore, although a single processing circuitry 210 is illustrated in FIG. 8 the processing circuitry 210 may be distributed among a plurality of devices, or nodes. The same applies to the functional modules 210a-210f of FIG. 9 and the computer program 1020 of FIG. 10.

Figure 10:
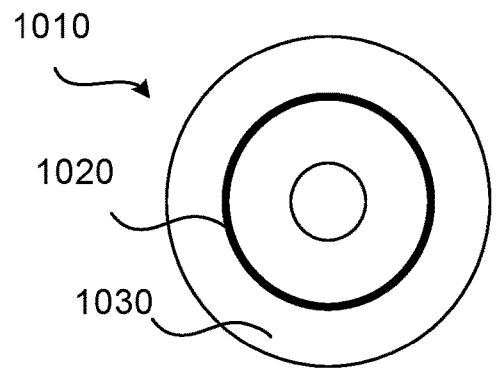
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for generating a three-dimensional, 3D, point cloud of a scene, the method being performed by an image processing device, the method comprising:
obtaining digital images depicting the scene, wherein each digital image is composed of pixels;
segmenting each of the digital images into digital image segments;
determining a depth vector and a normal vector per each of the digital image segments by applying multi-view stereo, MVS, processing to a subset of the pixels per each digital image segment;
forming a map of depth vectors and normal vectors per each pixel in the digital images based on the determined depth and normal vectors per each of the digital image segments; and
generating the 3D point cloud of the scene as a combination of all the maps of depth vectors and normal vectors per each pixel in the digital images,
wherein the pixel included in the subsets of pixels are defined by sample locations in the digital images, and
wherein the method further comprises verifying that each digital image segment comprises at least one sample location wherein, when at least one digital image segment fails to comprise at least one sample location, the segmentation of at least the digital image for which the digital image segment fails to comprise at least one sample location is repeated with increased size of the digital image segments.

2. The method according to claim 1, wherein each digital image segment has a centroid, and wherein the subset of the pixels are the centroids of the digital image segments.

3. The method according to claim 1, wherein the subset of the pixels is uniformly sampled pixels per digital image.

4. The method according to claim 1, wherein the scene comprises at least one object, wherein each of the at least one object has a size, and wherein how many digital image segments each digital image is segmented into depends on the size of the at least one object.

5. The method according to claim 4, wherein the size of the smallest object defines a lower bound on how many digital image segments each digital image needs to be segmented into.

6. The method according to claim 1, wherein how many digital image segments each digital image is segmented into depends on at how many sample locations in each digital image the MVS processing is applied.

7. The method according to claim 6, wherein total amount of sample locations in each digital image defines an upper bound on how many digital image segments each digital image needs to be segmented into.

8. The method according to claim 1, wherein segmenting the digital images into the digital image segments comprises applying a segmentation mask to each of the digital images.

9. The method according to claim 8, wherein the segmentation mask is dependent on the scene.

10. The method according to claim 1, wherein each digital image segment is equal to one super-pixel.

11. The method according to claim 1, wherein segmenting the digital images into the digital image segments comprises applying a segmentation mask to each of the digital images;
wherein each digital image segment is equal to one super-pixel; and
wherein the segmentation mask defines boundaries between the super-pixels.

12. An image processing device for generating a three-dimensional, 3D, point cloud of a scene, the image processing device comprising processing circuitry, the processing circuitry being configured to cause the image processing device to:
obtain digital images depicting the scene, wherein each digital image is composed of pixels;
segment each of the digital images into digital image segments;
determine a depth vector and a normal vector per each of the digital image segments by applying multi-view stereo, MVS, processing to a subset of the pixels per each digital image segment;

form a map of depth vectors and normal vectors per each pixel in the digital images based on the determined depth and normal vectors per each of the digital image segments; and generate the 3D point cloud of the scene as a combination of all the maps of depth vectors and normal vectors per each pixel in the digital images, wherein the pixel included in the subsets of pixels are defined by sample locations in the digital images, and wherein the method further comprises verifying that each digital image segment comprises at least one sample location wherein, when at least one digital image segment fails to comprise at least one sample location, the segmentation of at least the digital image for which the digital image segment fails to comprise at least one sample location is repeated with increased size of the digital image segments.

13. The image processing device according to claim 12, wherein the scene comprises at least one object, wherein each of the at least one object has a size, and wherein how many digital image segments each digital image is segmented into depends on the size of the at least one object.

14. An image processing device for generating a three-dimensional, 3D, point cloud of a scene, the image processing device comprising:
   at least one processor; and
   at least one memory storing program code executable by at least one processor to perform operations comprising to:
   obtain digital images depicting the scene, wherein each digital image is composed of pixels;
   segment each of the digital images into digital image segments;
   determine a depth vector and a normal vector per each of the digital image segments by applying multi-view stereo, MVS, processing to a subset of the pixels per each digital image segment;
   form a map of depth vectors and normal vectors per each pixel in the digital images based on the determined depth and normal vectors per each of the digital image segments; and
   generate the 3D point cloud of the scene as a combination of all the maps of depth vectors and normal vectors per each pixel in the digital images,
   wherein the pixel included in the subsets of pixels are defined by sample locations in the digital images, and wherein the operation further comprises verifying that each digital image segment comprises at least one sample location wherein, when at least one digital image segment fails to comprise at least one sample location, the segmentation of at least the digital image for which the digital image segment fails to comprise at least one sample location is repeated with increased size of the digital image segments.

15. A computer program product for generating a three-dimensional, 3D, point cloud of a scene, the computer program product comprising a non-transitory computer readable storage medium storing computer code which, when run on processing circuitry of an image processing device, causes the image processing device to:
   obtain digital images depicting the scene, wherein each digital image is composed of pixels;
   segment each of the digital images into digital image segments;
   determine a depth vector and a normal vector per each of the digital image segments by applying multi-view stereo, MVS, processing to a subset of the pixels per each digital image segment;
   form a map of depth vectors and normal vectors per each pixel in the digital images based on the determined depth and normal vectors per each of the digital image segments; and
   generate the 3D point cloud of the scene as a combination of all the maps of depth vectors and normal vectors per each pixel in the digital images,
   wherein the pixel included in the subsets of pixels are defined by sample locations in the digital images, and wherein the method further comprises verifying that each digital image segment comprises at least one sample location wherein, when at least one digital image segment fails to comprise at least one sample location, the segmentation of at least the digital image for which the digital image segment fails to comprise at least one sample location is repeated with increased size of the digital image segments.

* * * * *